US009010583B2

(12) United States Patent
Sevcik et al.

(10) Patent No.: US 9,010,583 B2
(45) Date of Patent: Apr. 21, 2015

(54) UNDERCOUNTER ICE DISPENSER

(75) Inventors: E. Scott Sevcik, Crystal Lake, IL (US);
Dusan N. Ivancevic, Carol Stream, IL (US); Andrew J. Sanguinet, Oak Park, IL (US); Thaddeus M. Jablonski, Palatine, IL (US); Andrew J. Tobler, Geneva, IL (US); Peter S. Tinucci, Wheaton, IL (US); Vincenzo DiFatta, Wood Dale, IL (US)

(73) Assignee: Cornelius, Inc., St. Paul, MN (US)

( * ) Notice: Subject to any disclaimer, the term of this patent is extended or adjusted under 35 U.S.C. 154(b) by 1025 days.

(21) Appl. No.: 12/806,897

(22) Filed: Aug. 24, 2010

(65) Prior Publication Data

US 2011/0049190 A1   Mar. 3, 2011

Related U.S. Application Data

(60) Provisional application No. 61/275,083, filed on Aug. 25, 2009.

(51) Int. Cl.
| | |
|---|---|
| *G01F 11/20* | (2006.01) |
| *B67D 7/80* | (2010.01) |
| *G01F 13/00* | (2006.01) |
| *F25C 5/00* | (2006.01) |
| *F25C 5/18* | (2006.01) |

(52) U.S. Cl.
CPC .............. *G01F 13/005* (2013.01); *F25C 5/002* (2013.01); *F25C 5/187* (2013.01)

(58) Field of Classification Search
USPC ...................... 222/236, 413, 412, 146.6, 252; 198/657, 676, 666; 62/389, 390
See application file for complete search history.

(56) References Cited

U.S. PATENT DOCUMENTS

| | | | | |
|---|---|---|---|---|
| 2,138,576 A | * | 11/1938 | Gebert .......................... | 198/666 |
| 2,394,163 A | * | 2/1946 | Gebert .......................... | 198/666 |
| 2,443,288 A | * | 6/1948 | Anderson ..................... | 198/666 |
| 2,492,915 A | * | 12/1949 | Carlson ........................ | 198/666 |
| 3,104,757 A | * | 9/1963 | Dougherty et al. ........... | 198/666 |
| 3,178,210 A | * | 4/1965 | Dickinson .................... | 403/292 |
| 3,211,338 A | * | 10/1965 | Weil et al. .................... | 222/643 |
| 3,301,338 A | * | 1/1967 | Dickinson .................... | 175/323 |
| 3,417,903 A | * | 12/1968 | Callen .......................... | 222/238 |
| 3,513,477 A | * | 5/1970 | Hayashi ....................... | 418/208 |
| 3,608,786 A | * | 9/1971 | Shelley et al. ............... | 222/232 |
| 3,610,406 A | * | 10/1971 | Fleischauer et al. ......... | 198/789 |
| 3,610,482 A | * | 10/1971 | Van Steenburgh, Jr. ...... | 222/403 |
| 3,664,444 A | * | 5/1972 | Henson ......................... | 198/666 |
| 3,715,119 A | * | 2/1973 | Shelley et al. ............... | 222/241 |
| 3,719,307 A | * | 3/1973 | Larson ......................... | 222/236 |
| 3,913,343 A | * | 10/1975 | Rowland et al. ............. | 62/137 |
| 4,621,968 A | * | 11/1986 | Hutchison .................... | 414/311 |
| 4,852,719 A | * | 8/1989 | Lapeyre ....................... | 198/666 |
| 4,921,149 A | | 5/1990 | Miller et al. | |
| 5,058,773 A | * | 10/1991 | Brill et al. ................... | 222/129.4 |
| 5,099,985 A | * | 3/1992 | Lapeyre ....................... | 198/658 |

(Continued)

*Primary Examiner* — Kevin P Shaver
*Assistant Examiner* — Stephanie E Williams
(74) *Attorney, Agent, or Firm* — Andrus Intellectual Property Law, LLP

(57) ABSTRACT

An improved undercounter ice dispenser is disclosed that has a multiple piece auger made in sections for moving ice from the dispenser bin to its ice chute. The auger ice chute invention includes a sensor to reduce ice jamming and to detect when the ice chute is filled or needs filling and works in conjunction with a paddle on the auger to help make the transition. Proportional size ice quantities may also be selected via an interface and auger control.

3 Claims, 19 Drawing Sheets

(56) References Cited

U.S. PATENT DOCUMENTS

| | | | |
|---|---|---|---|
| 5,267,672 A | * | 12/1993 | Jacobsen et al. ............ 222/159 |
| 5,542,573 A | * | 8/1996 | Frantz ....................... 222/129.1 |
| 5,899,319 A | * | 5/1999 | Jarnagin ....................... 198/666 |
| 6,039,220 A | | 3/2000 | Jablonski et al. |
| 2007/0068970 A1 | * | 3/2007 | Hanaoka et al. ............. 222/240 |
| 2008/0061088 A1 | * | 3/2008 | Park et al. .................... 222/477 |

* cited by examiner

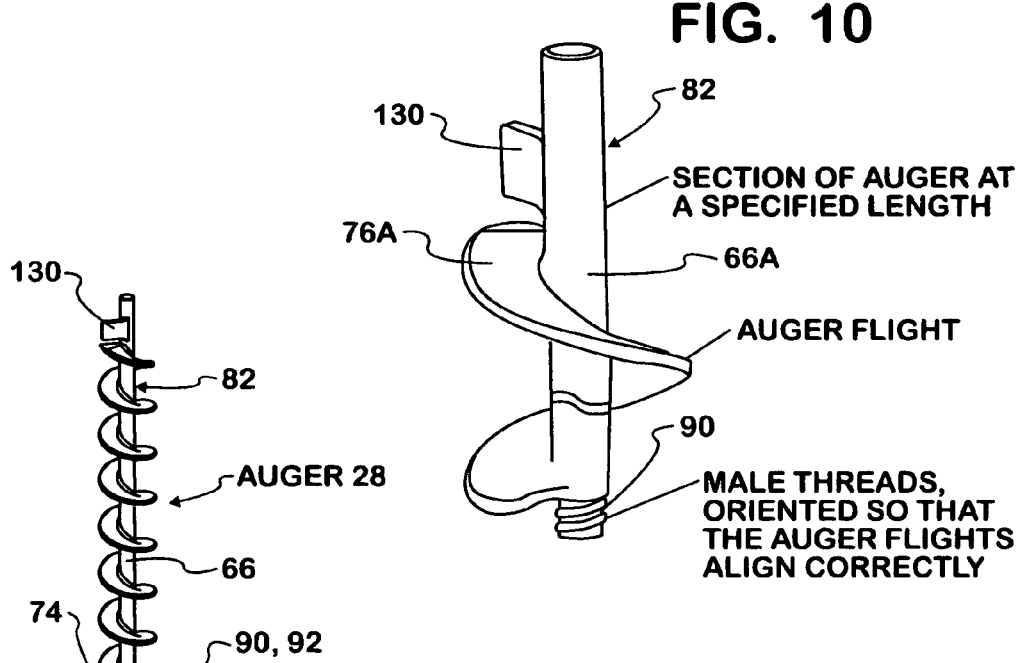
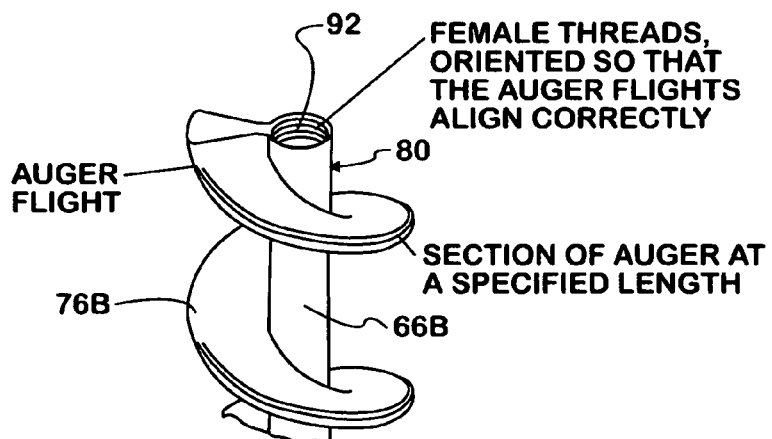
FIG. 9
FIG. 10
FIG. 11

UNDERCOUNTER ICE DISPENSER

DISCLOSURE

This application is a United States Non-Provisional patent application, claiming the benefit and filing date of Aug. 25, 2009 of U.S. Provisional Patent Application Ser. No. 61/275, 083, and relates to an improved commercial, undercounter ice dispenser and methods for making and servicing the same, and particularly to an ice delivery auger for bringing the ice from an undercounter bin to a counter level dispenser and dispensing the same.

BACKGROUND OF THE INVENTION

Heretofore, it was known to dispense ice from an ice bin located underneath a service counter. The advantage of such configuration was the ice dispenser was located at the counter level, but the ice bin and related equipment could be located below the counter and out of sight, thus providing additional counter space. As is well known, counter space is a valuable commodity in a retail establishment, and any increase in counter space is of value. Such undercounter construction is known in the art. One way of bringing ice from the under-counter bin to the counter level dispenser was with an ice auger. Generally, this prior art auger was a one piece assembly (made unitary, such as machined from one piece of aluminum, or originally formed from several pieces and made unitary as by welding) which was from 3 to 5 feet in length, 4 feet being typical. The unitary auger construction was desired because of the loads imposed by the ice on the auger, and the length was necessary to reach from the bottom of the bin to the upper discharge point.

The one piece long auger, however, had its own handicaps. The long auger had to be handled carefully as its long length made it more susceptible to being damaged or bent. It was more difficult to install, particularly in the field at the retail outlet. If the dispenser was in a low (9 feet or less) ceiling area, the ceiling could interfere with the removal and installation of the long single piece agitator for servicing, and it might be necessary to move the entire dispenser to a higher ceiling area where it could be serviced. Inventory storage of replacement augers and their shipment to field locations were more difficult due to the auger's long length.

SUMMARY OF THE INVENTION

In the present invention a commercial, undercounter ice bin and counter level ice dispenser chute or point have been provided with a multi piece auger, of at least two pieces, so that the auger is assembled from the at least two shorter pieces (say from two 1½ feet to two 2¼ feet sections) into its full auger length (3 to 5 feet). Now the auger could if desired be made in three or even four lengths segments or pieces. The construction of the present invention and method of using the some overcomes the disadvantages of the prior art one piece full length auger. The auger of the present invention being easier to make, install, and service, particularly in the field, store in inventory and ship, is due to its shorter length segments, each of which is also less susceptible to damage and/or bending.

Additionally, the undercounter ice bin dispenser of the present invention has been fitted with a proportional ice dispense means and function for dispensing various quantities of ice for various size drinks or cups, improved speed of service, volume, quality and ease of operator use. This means is similar to that disclosed in IMI Cornelius Inc.'s U.S. Pat. No. 6,039,220, which is hereby incorporated by reference. Further, the ice is transported into a visual storage dispense tube so the customer/operator can see the excellent quality ice to be dispensed into the next drink, or if there is a problem, or insufficient amount of ice. The dispenser is also fitted with an ice level sensor at the top of the auger in the visual storage tube, which sensor could be mechanical-electrical, such as a flipper and micro switch, or non-contact, (such as laser, ultra sonic, radar, weight sensors). The sensing device or devices could also be utilized to provide multiple proportion size ice for various size drinks and/or as an input into the control unit for the dispenser.

The control unit operates the dispense only when ice is present and the proportional ice delivery system through a customer/operator interface for selecting different size portions of beverages (e.g. large, medium or small). The control system and interface provide feedback means to the customers/operators to alert them as to the dispenser's performance and prevent a drink dispense unless the proper volume of ice is available for that dispense.

The two or more piece auger at its discharge point and end is provided with a discharge paddle to help reorient the ice movement from upward vertically off of the auger to horizontally, to move it toward the top of the adjacent ice discharge chute and prevents heretofore occurring packing and/or jamming at such point, and also assists in moving ice through such change of direction when filling the ice discharge chute.

DESCRIPTION OF THE DRAWINGS

FIG. 9 is a perspective view of the assembled auger portion.

FIG. 10 is an enlarged perspective view of the threaded male portion of the auger that joins to the threaded female portion shown in FIG. 9.

FIG. 11 is an enlarged perspective view of the female portion of the auger that joins to the male portion shown in FIG. 9.

DESCRIPTION OF PREFERRED EMBODIMENTS

Figure 1:
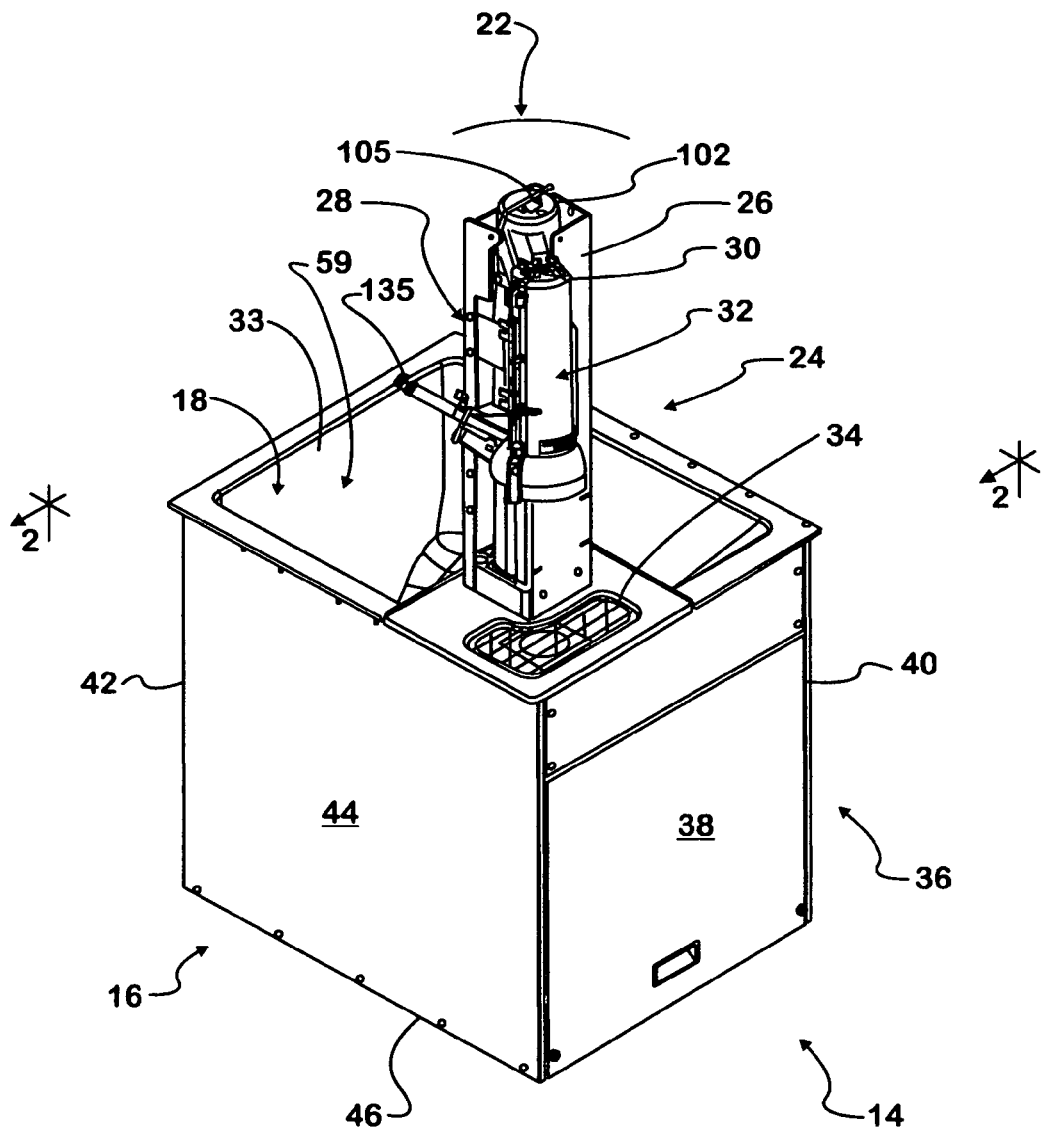
FIG. 1 is a perspective view of the undercounter ice bin, auger, and counter level discharge chute device of the present invention.
Figure 20:
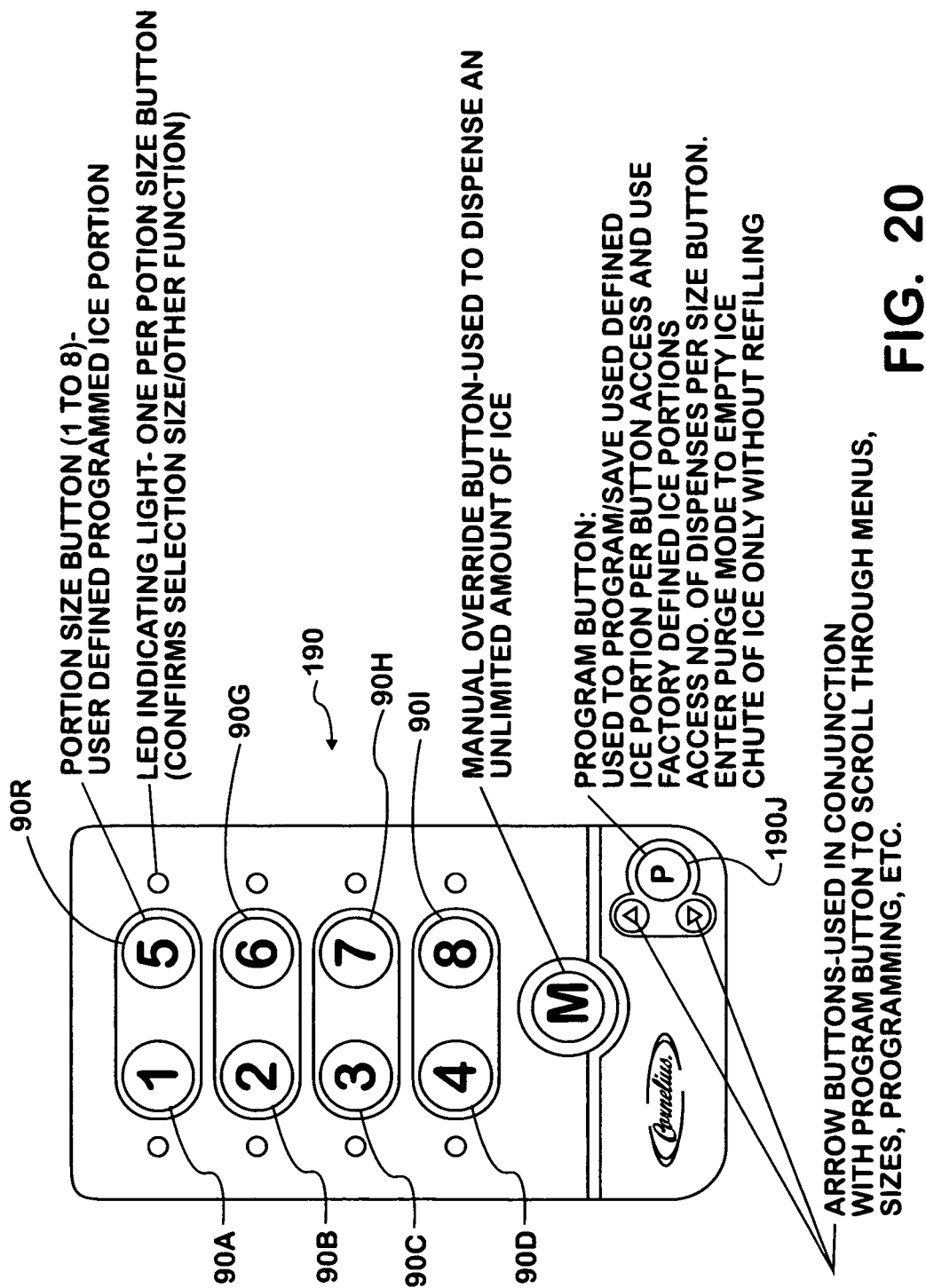
FIG. 20 is a view of the customer/operator interface or keypad.

Referring to FIG. 1, an undercounter ice dispenser 14 is shown and comprises a lower portion 16 providing an ice bin 18 that is below the countertop level indicated by the arrow 20 (FIG. 20). The dispenser 14 also includes an upper portion 22 that rises above the counter level 20 and includes the upper portion 24 of a delivery means 26, in the form of an auger means 28. The auger means 28 delivers ice into the top 30 of an ice delivery chute 32. All of these components will be further described below. The counter 33 also contains a service drain area 34 wherein any spilt ice and ice melt water can be collected.

Figure 2:
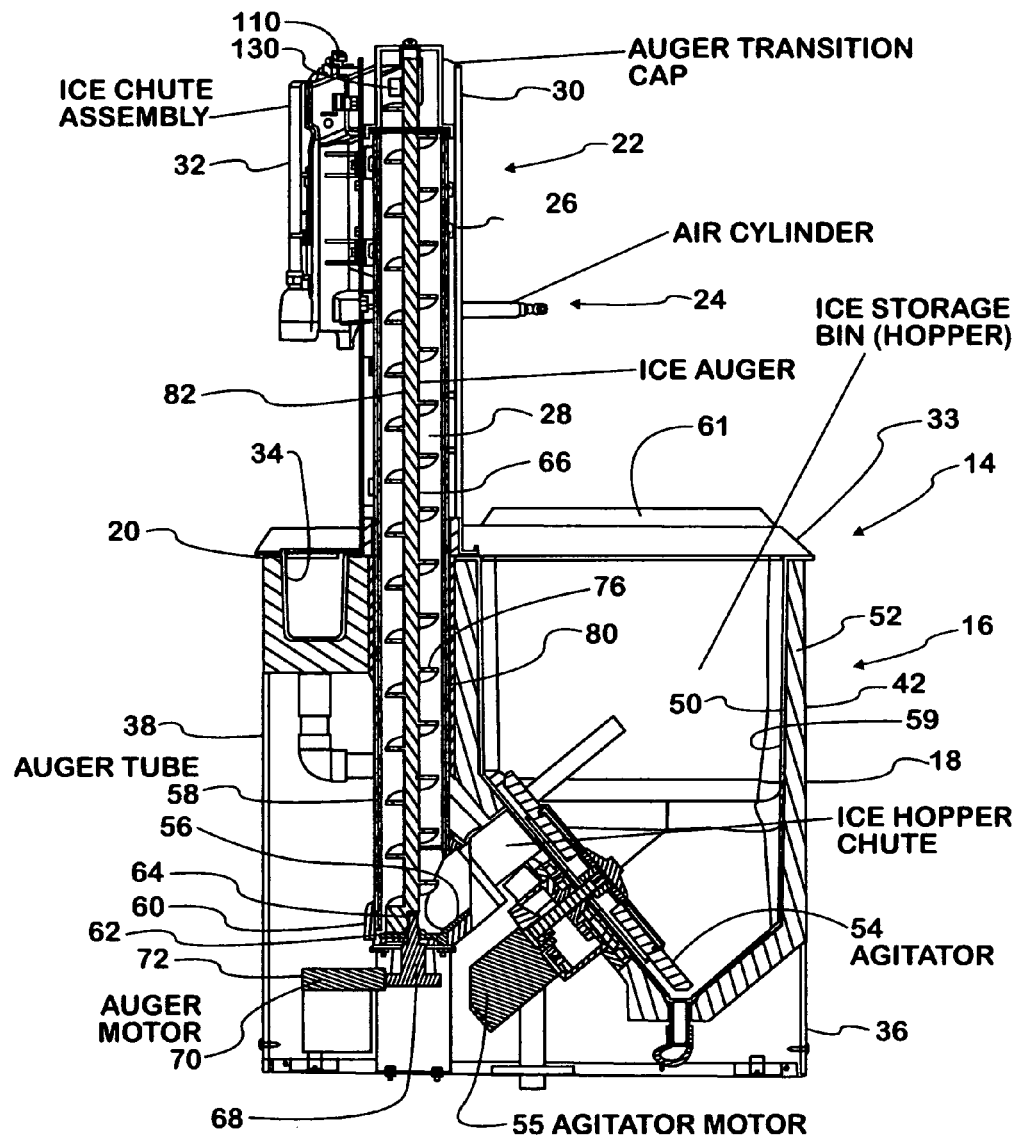
FIG. 2 is a generally cross-section taken on the lines 2-2 of FIG. 1.

As shown more fully in FIGS. 1 and 2, the ice bin 18 is contained within a base or cabinet 36 including four sides 38, 40, 42 and 44, a bottom 46 and carries the countertop 33. The ice bin 18, itself, has an inner surface 50 made of non-rusting material, such as metal, aluminum, stainless steel or plastic. The exterior of these inner surfaces are covered with insulating material 52. At the bottom of the bin 18, an agitator 54 and its motor 55 is provided to drive the ice into a lower discharge tube 56. The lower discharge chute 56 at its bottom intersects with an auger tube 58. The bin also has an ice sensor 59. The ice bin 18 also has a removable top 61 to close its upper end.

The bottom of the auger tube 58 is mounted in an auger housing 60, which is closed off except for an opening 62 for a driven portion 64 of the central auger shaft 66. The auger shaft 66 at its bottom is fitted with a driven gear 68, which engages a driving gear 70, which can be rotated by a motor 72.

The auger tube 58 is generally vertically oriented to move ice from the bottom upward to above the counter level 20. To accomplish this task, the auger means 28 includes a flight or helical portion 76 wrapping around the auger shaft 66. At the top and bottom, the auger 28 is mounted to rotate in its tube 58, and as it does so it moves the ice upwards.

Heretofore the auger would have been a single, full length piece of from 3 to 5 feet in length. Utilizing one aspect of the present invention, now the auger means 28 and particularly its shaft 66 and its flight 76 are made in two or more longitudinal sections, preferably one of which is about one half or less than the total length of the auger. That is the shaft 66 and is flight 76 of each section are unitary to carry the ice imposed loads, but the auger has at least a lower section 80 (with its unitary shaft and flight) and an upper section 82 (with its unitary shaft and flight). With this construction, it is much easier to remove or install the entire auger (both sections 80 and 82), particularly in the field. In the field in low ceiling areas the top section can be removed first, then the lower section of the auger. The multi piece construction also has the advantage noted above, of less susceptible to damage or bending, easier to make, keep in inventory, and ship to field locations. If the auger is made in two or three similar length sections that would also facilitate cleaning the sections thereof in an industrial, commercial or other dishwasher.

Figure 8:
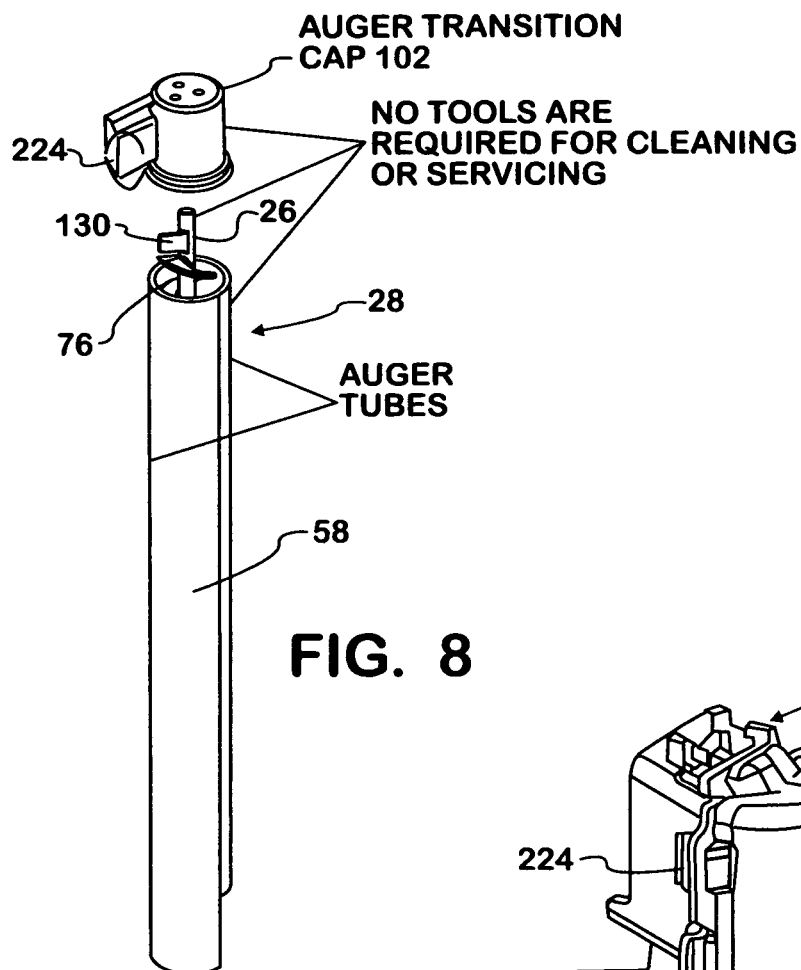
FIG. 8 is a perspective exploded view of the auger, its tube and top, and transition cap that feeds ice to the adjacent discharge chute.
Figure 7:
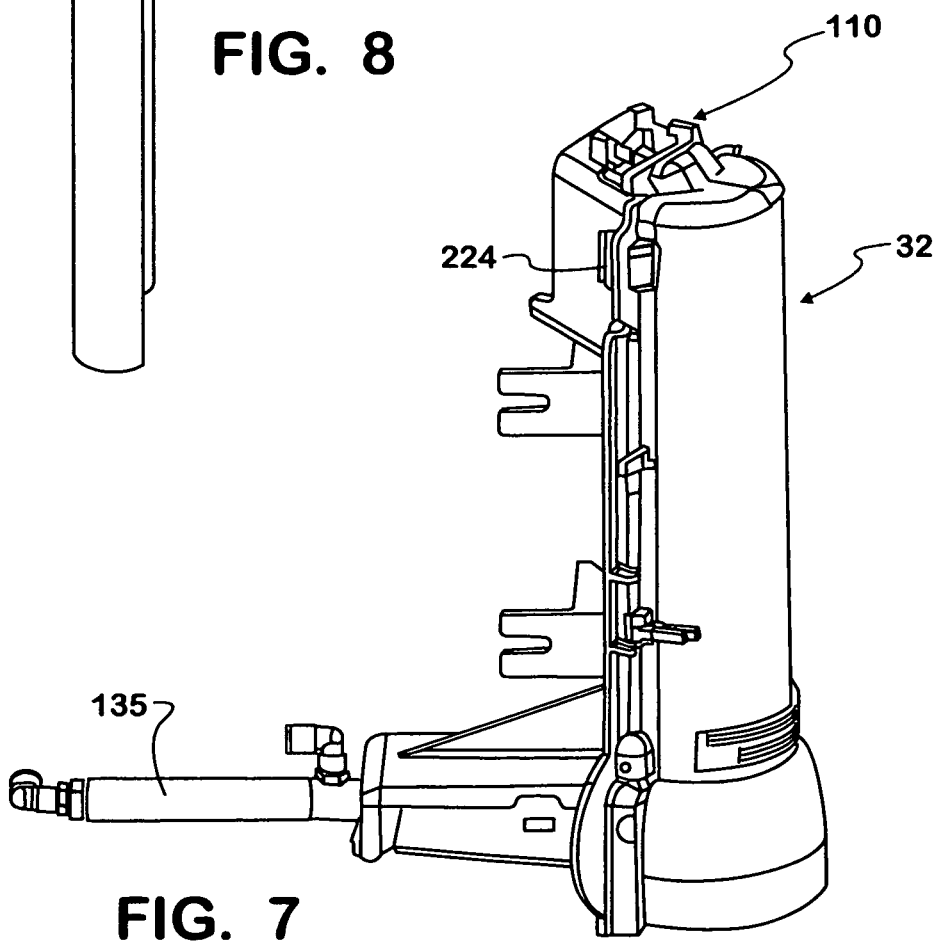
FIG. 7 is an elevational view of the discharge chute.
Figure 12:
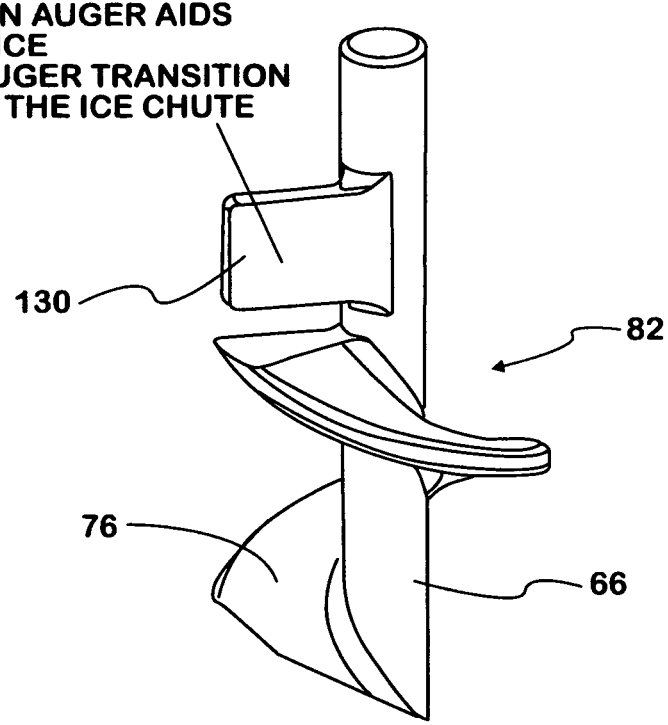
FIG. 12 is an enlarged perspective view of the paddle on the top of the top portion of the auger which helps ice transition from upward vertically to horizontally into the top of the ice discharge chute.

As noted in FIGS. 9-11, the adjacent upper end of the lower portion 80 and the lower end of the upper portion 82 of the auger means 28, auger shaft 66 and flight 76 are joined to each other at 66A, 66B and 76A and 76B. The flight portions 76A and 76B smoothly lead into each other. One means of forming this connection between the upper 82 and lower 80 sections, is by providing cooperating fastening means, such as male and female threads 90 and 92, respectively, on the shaft portions 66A and 66B. The thread hand is chosen so that auger rotation moving ice upwards tends to tighten such threaded connection. The fully assembled auger 28 with its two or more sections 80 and 82 is shown in FIG. 9, and the auger fitting within its auger tube 58 is shown in FIG. 8.

Figure 13:
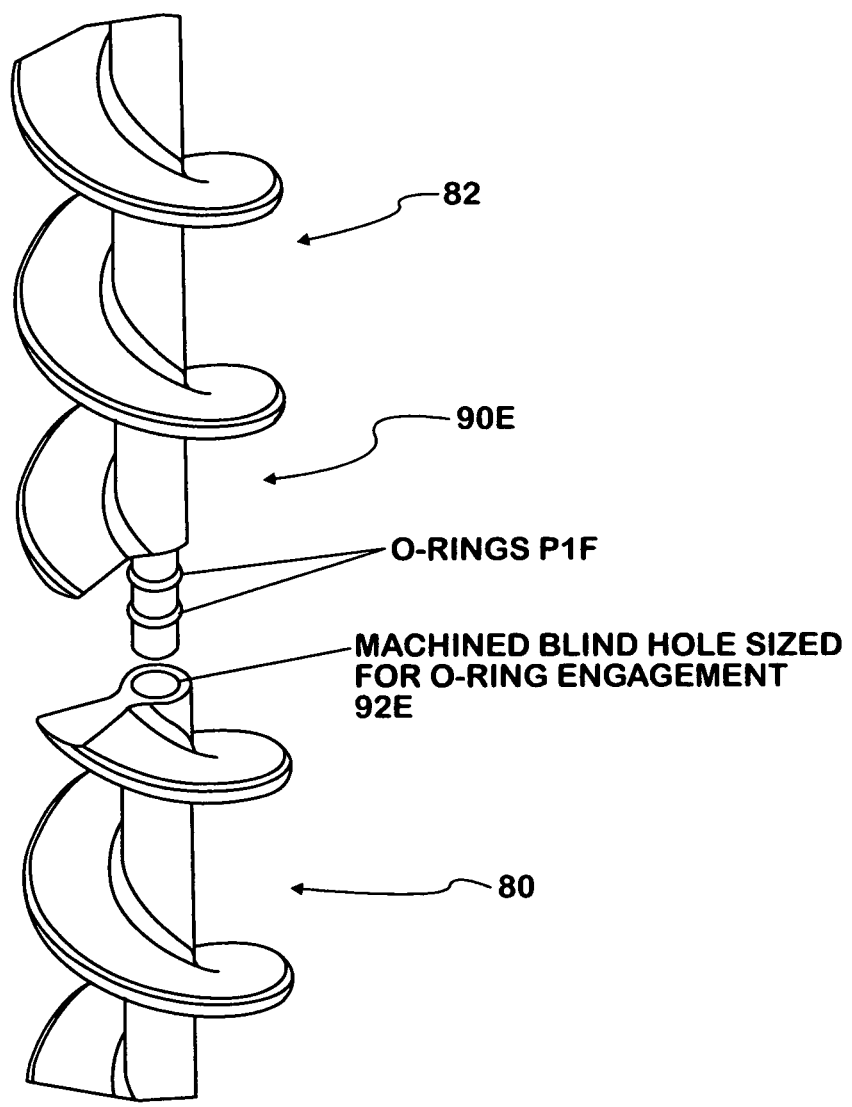
FIGS. 13 to 19 show alternative means and methods for holding together, joining and/or connecting adjacent auger segments or sections.
Figure 14:
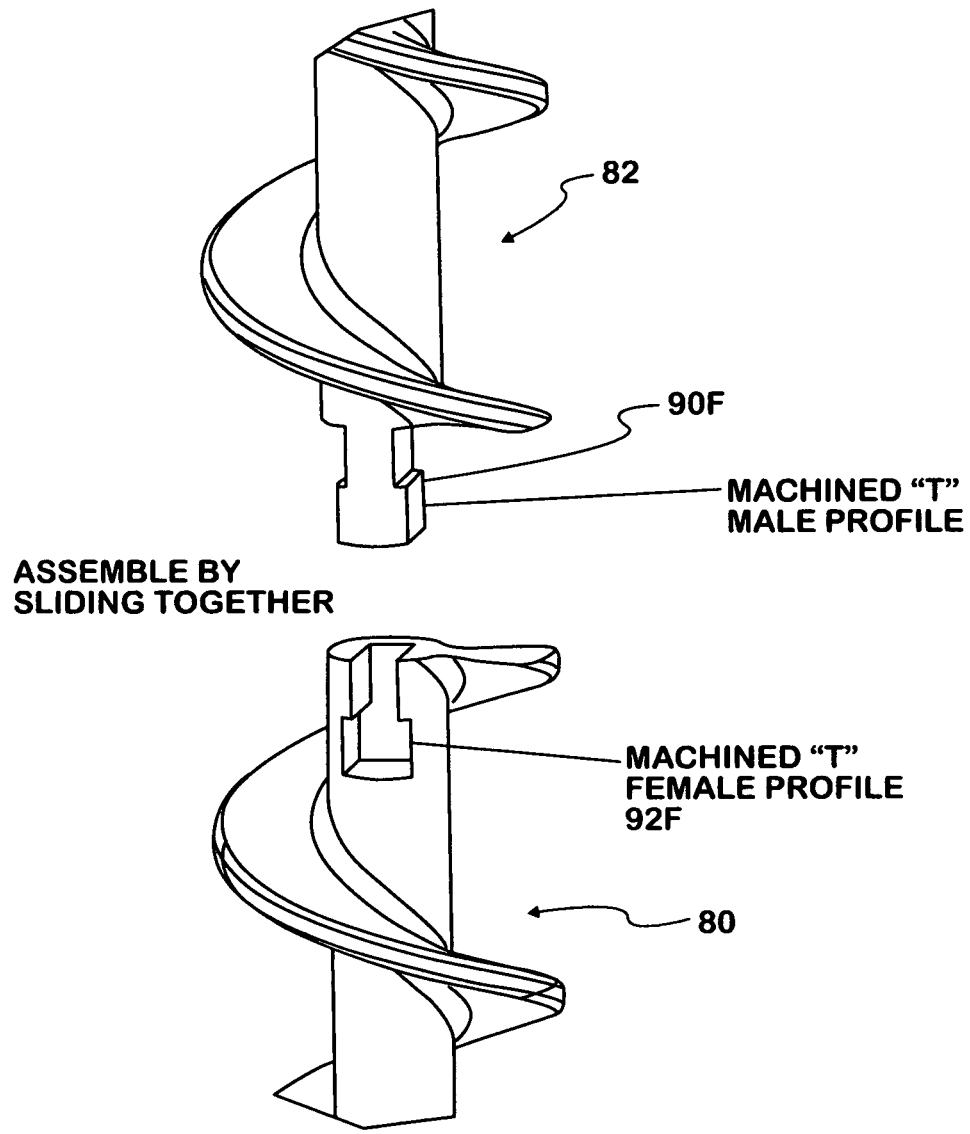
Figure 15:
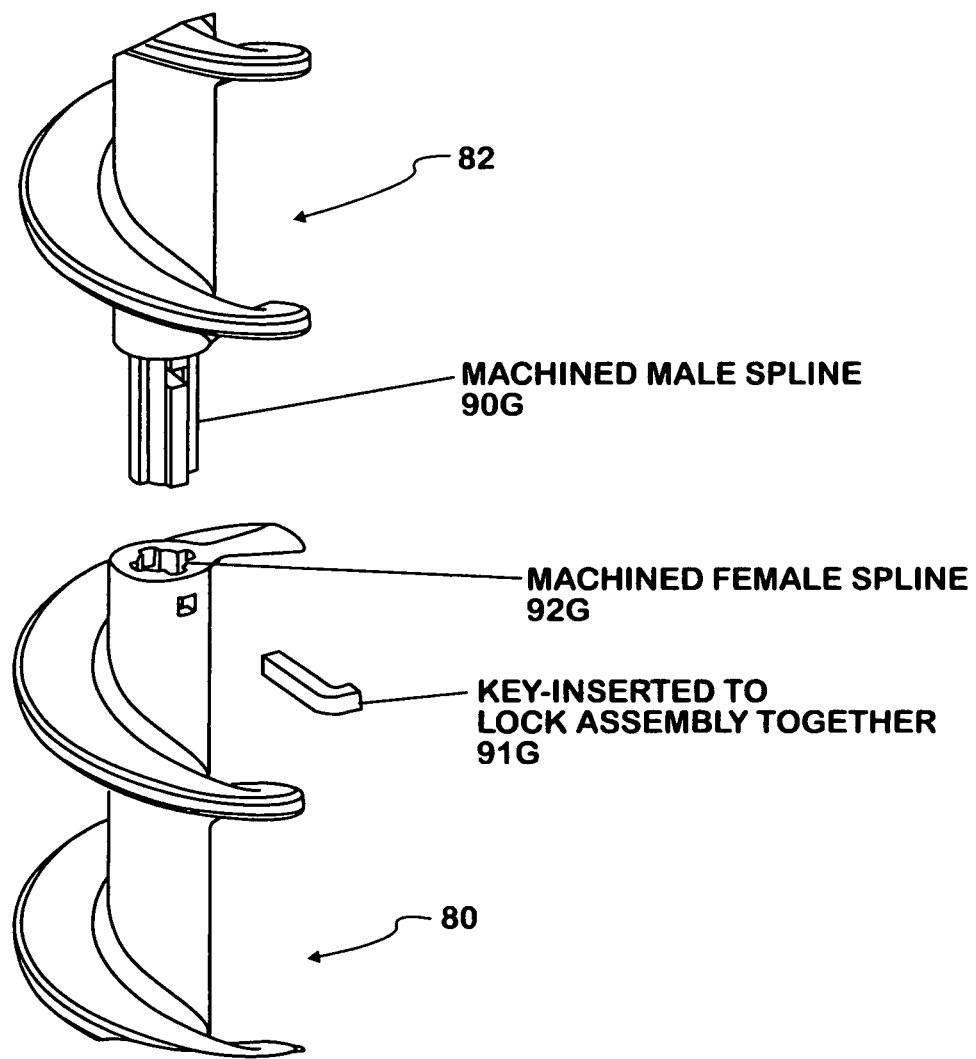
Figure 16:
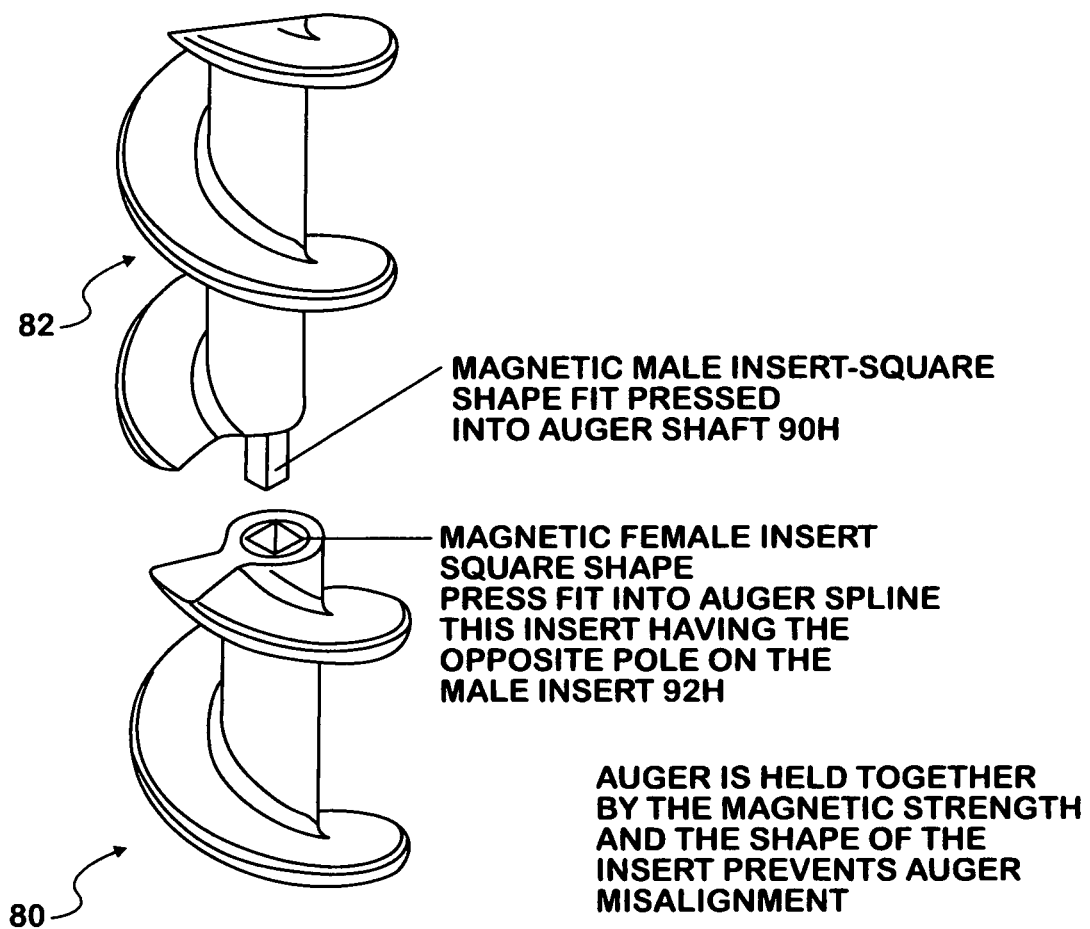
Figure 17:
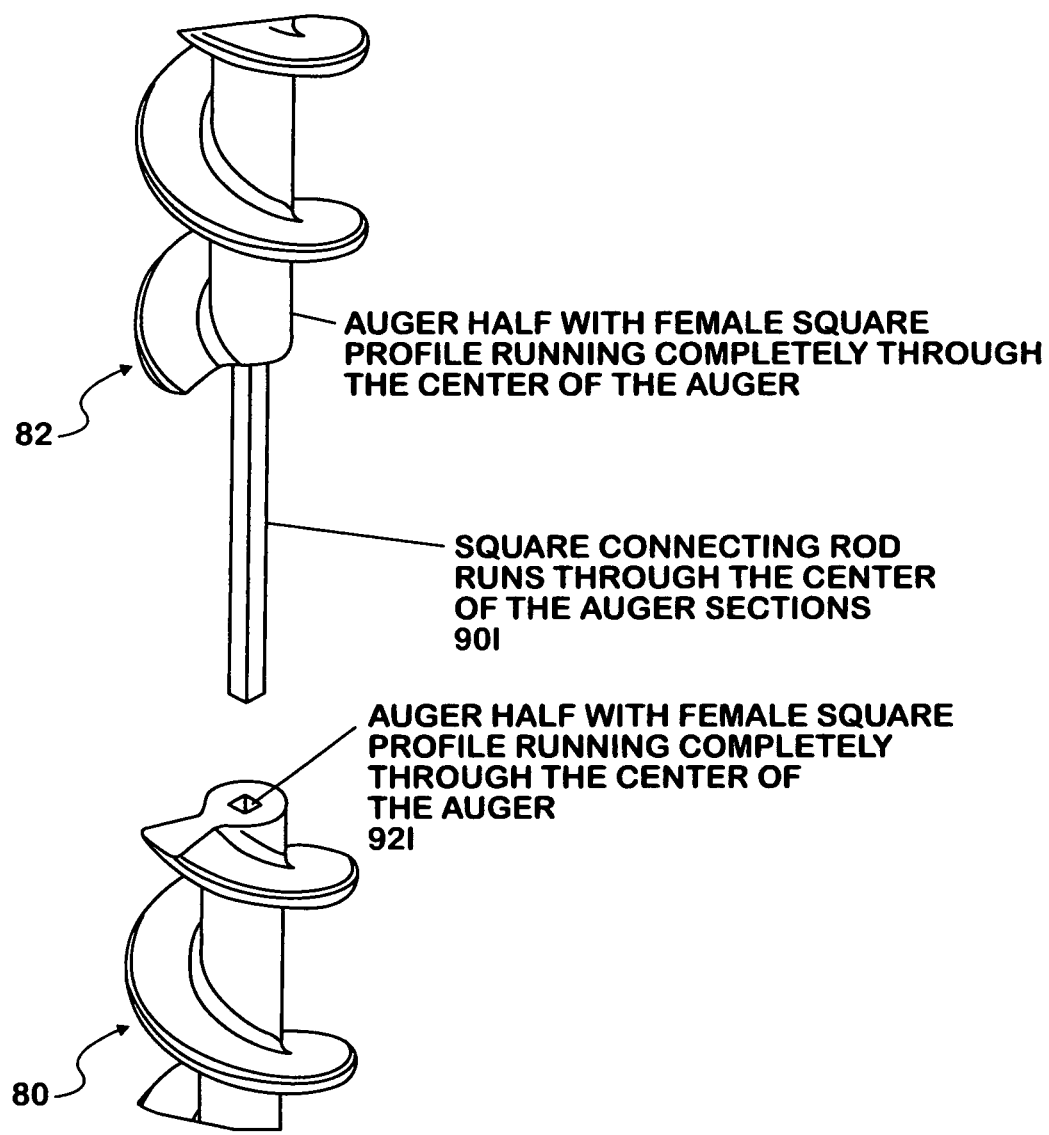
Figure 18:
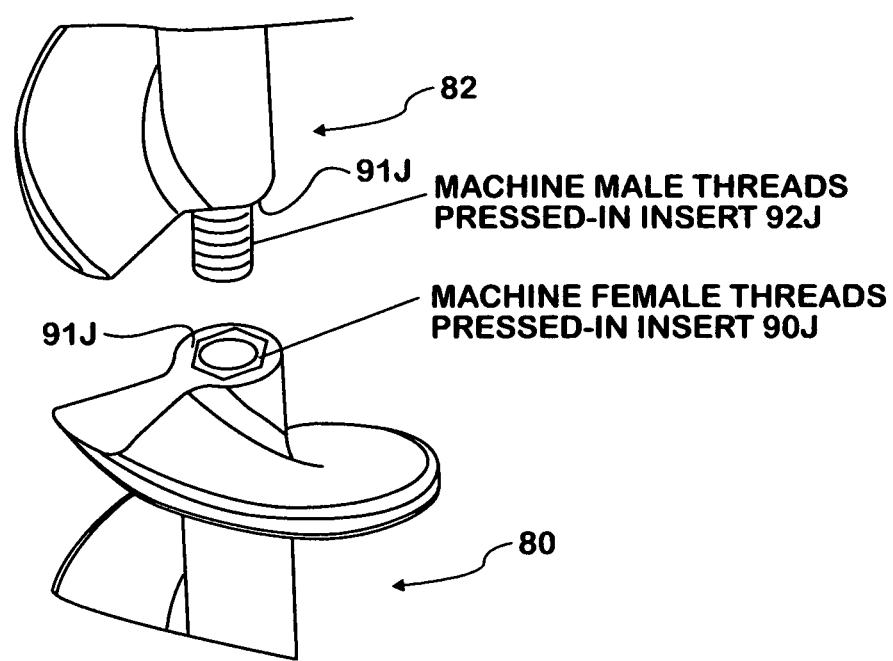
Figure 19:
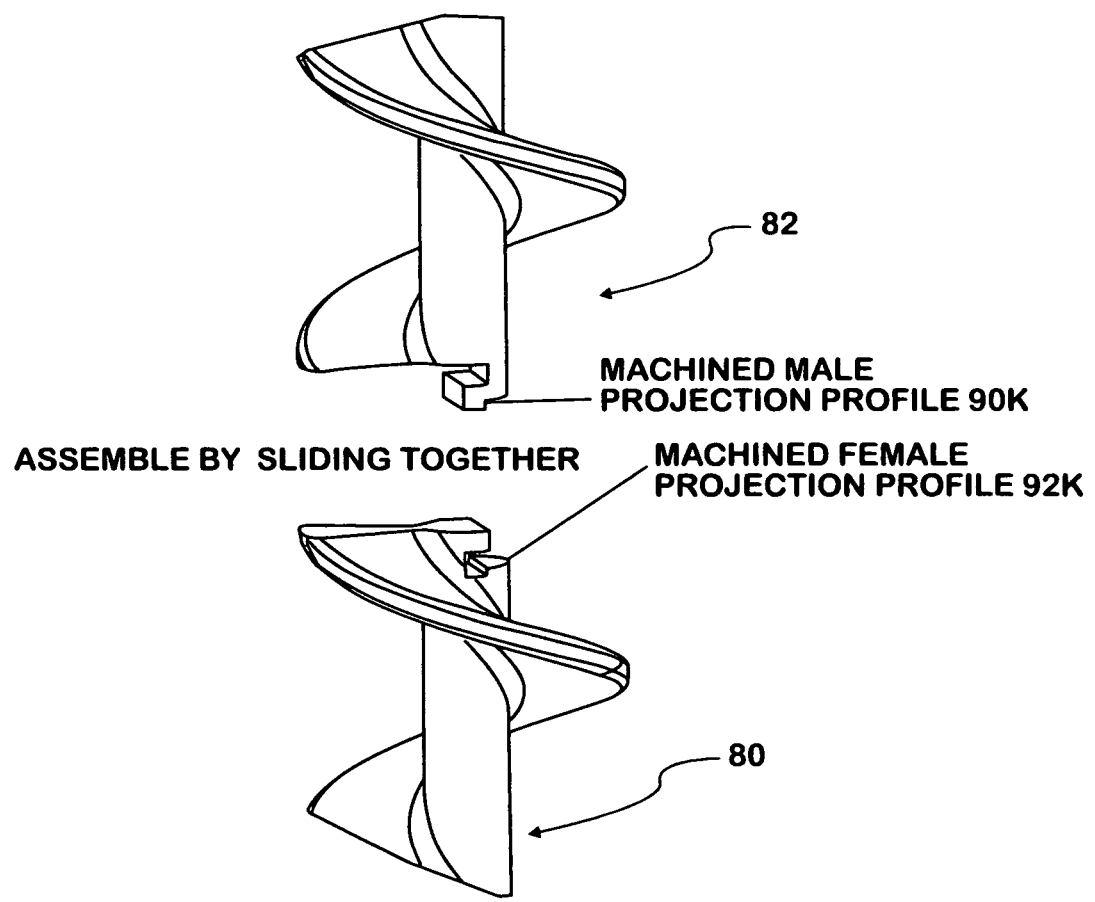

In FIGS. 13-19 alternative means and methods of joining the adjacent auger sections are shown. FIG. 13 shows a male portion 90E carrying one or more, and here two "O" rings 91E fitting into a complimenting female opening 92E. FIG. 14 shows a "T" portion 90F formed in one section with a complimentary "T" slot 92F formed on the other section. The "T" portion only extends partially, in this version about half way, through their respective shaft. FIG. 15 shows a male splined shaft 90G and complimentary female splined opening 92G on the adjacent section. The two sections could be held together by a pin or key 91G. FIG. 16 shows male magnetic portions 90H and a complimentary female magnetic portion 92H, with the magnets therein being of opposite adjacent poles to attract each other. FIG. 17 shows a guide rod 90I secured as by being threaded or pressed into its auger section, with a complimentary female opening 92I on the adjacent auger section. FIG. 18 shows a concept somewhat similar to that in FIGS. 9 and 10, except the male and female thread portions 90J and 92J are in the form of inserts (in this instance not round but hexagonal) that are pressed into the hollowed ends 91J of the adjacent auger sections. FIG. 19 shows an off center male projection 90K that fits into a complimentary offset slot 92K. Of course the associated upper and lower connections shown in these FIGS. 9 to 19 could be reversed. That is, for example, the male and female upper and lower parts reversed.

Figure 3:
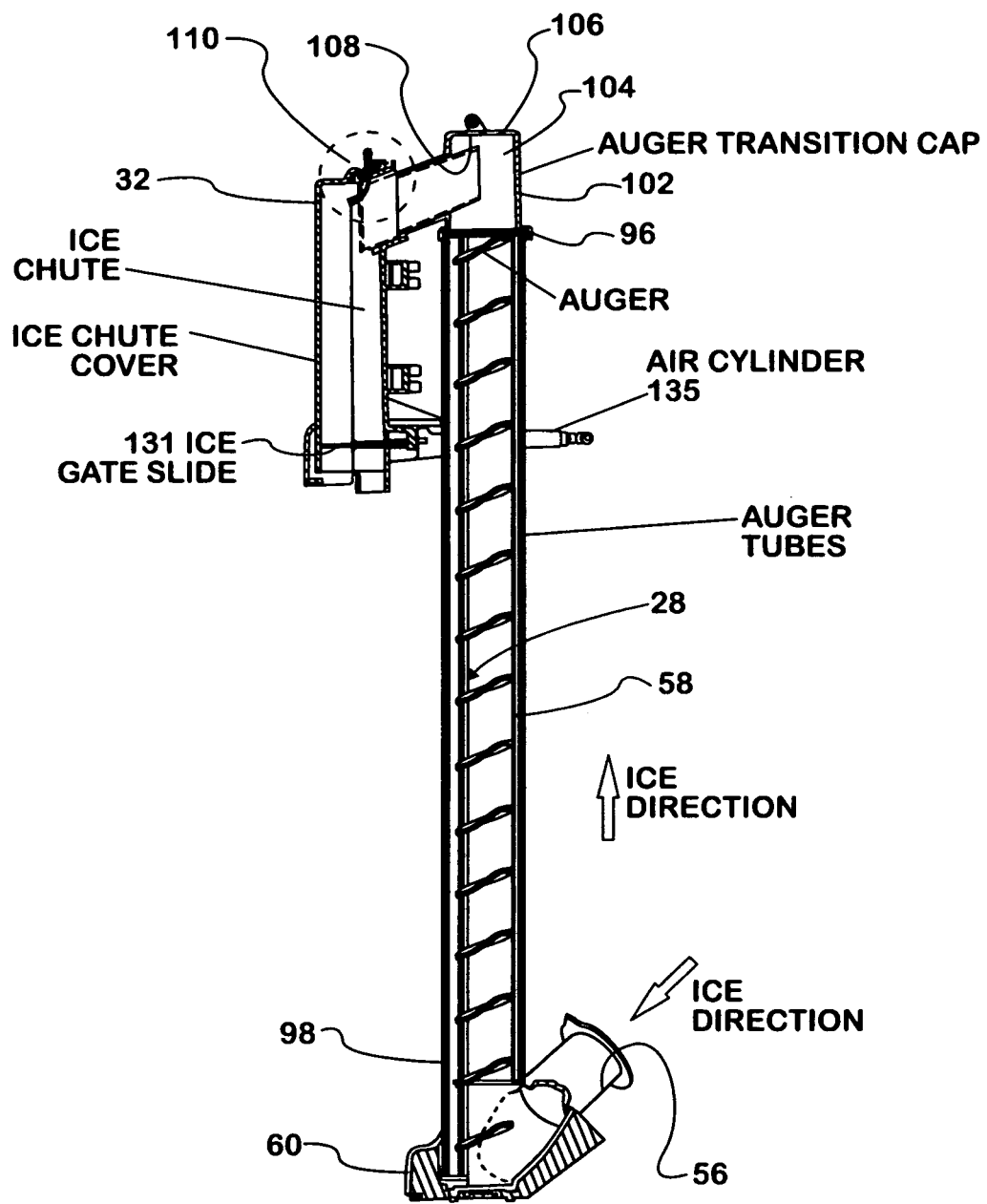
FIG. 3 is a view similar to FIG. 2, but showing only the auger tube, auger and discharge chute portions of the present invention.
Figure 4:
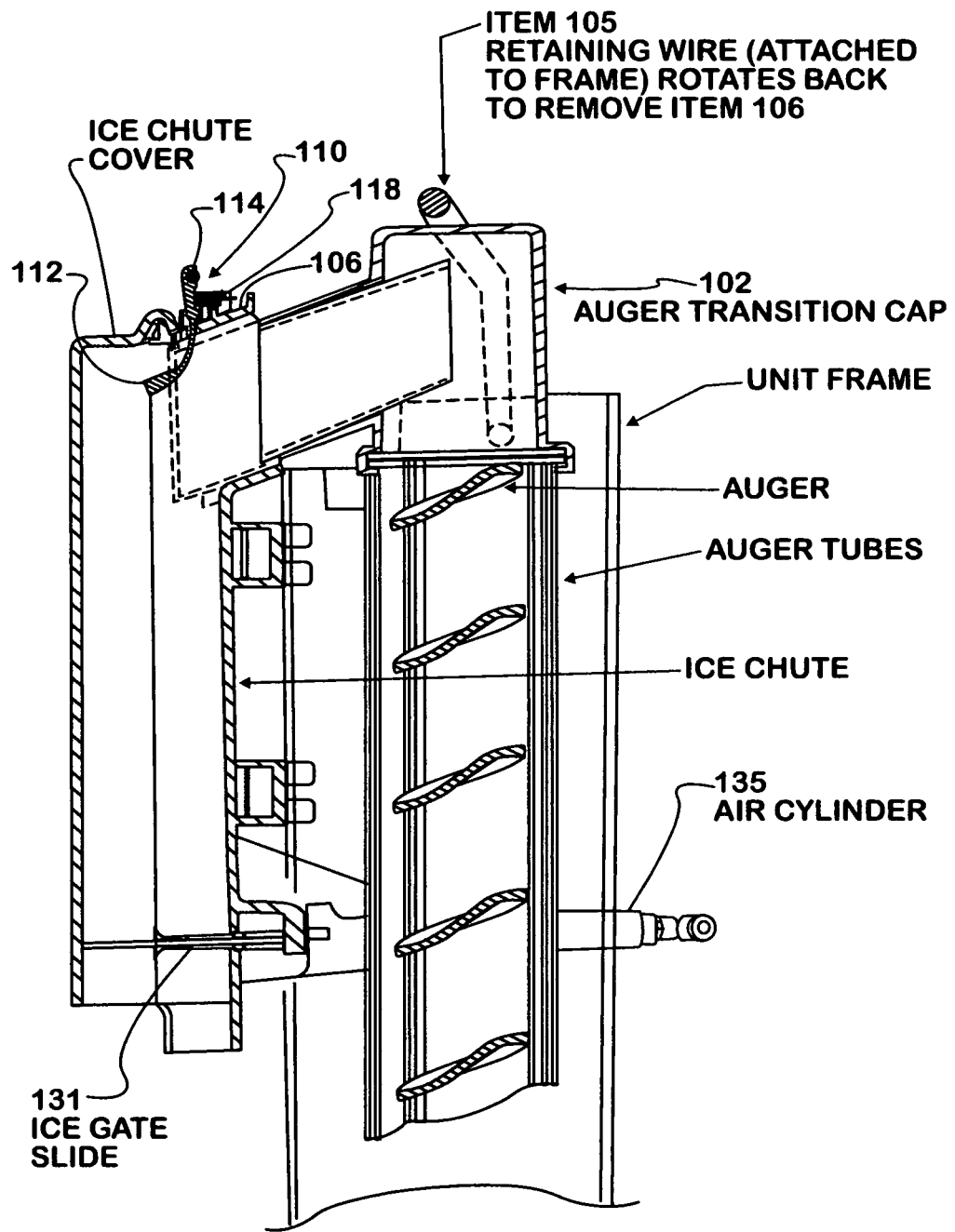
FIG. 4 is an enlargement of the upper portion shown in FIG. 3.
Figure 5:
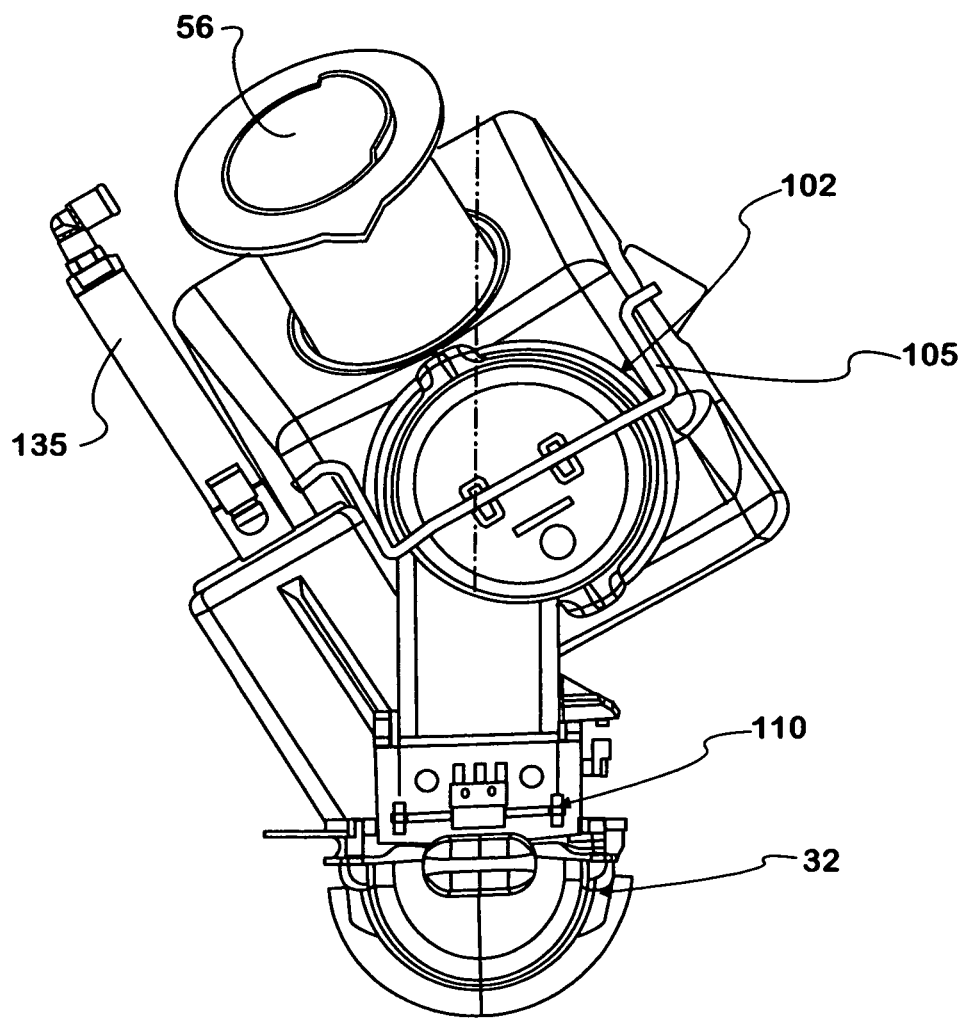
FIG. 5 is a further enlarged top view of the portions shown in FIG. 3.
Figure 6:
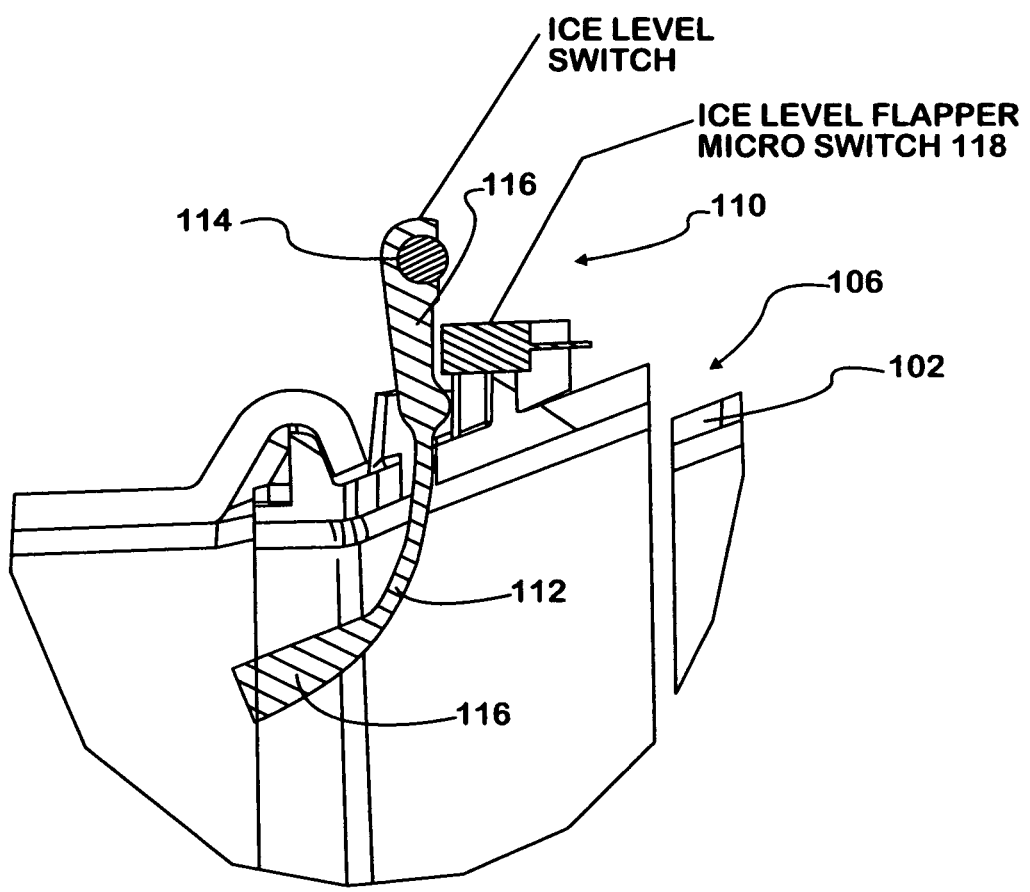
FIG. 6 is a further enlarged cross-sectional view of one form of the ice level sensing means that can be used at the top of the auger tube.

Referring to FIG. 3, ice is delivered from the bin 18, up the auger 28 and then into the top of the discharge chute 32. The discharge chute 32 can be seen in FIGS. 1 to 7. The auger tube 58 itself, the auger housing 60 and the mountings for the upper end 96 and lower end 98 of the auger 28 are generally conventional with the motor gear case providing lower bearing means and holding the auger 28 generally centered in the tube 58 with the tube 58 providing any needed additional centering or other guidance. The tube 58 is made of rust resistant material, such as metal, aluminum, stainless steel or plastic.

The auger 28 at its top 96 discharges into a transition cap portion 102 of the discharge chute 32. The transition cap portion 102 is shown in FIGS. 1 to 7 and is generally cylindrical having a side wall 104 with a top wall 106 and a downwardly and outwardly inclined discharge outlet portion 108. This cap 102 is held to the top of the auger tube 58 as by a metal retaining wire 105 that is secured to the unit's superstructure. The auger tube 58 at its lower end is held in place and aligned with the opening of the lower discharge tube 56.

The present invention includes ice sensor level means 110 (See FIGS. 2 to 7) at the top of the transition cap 102 to keep the auger running at a maximum efficiency, providing a signal for turning the auger "on," when ice is needed in the discharge chute 32, and the auger "off," when ice is not needed. Previously, such ice level sensors were not provided in prior art under counter units. In the present embodiment, the ice sensor 110 includes the mechanical ice level flapper 112 which is pivotally mounted on the cap top 106 (FIGS. 3, 4) by a pivot point or rod 114. The contact portion 116 below the pivot 114 of the flapper 112 can be pivoted into contact with a micro switch 118 to provide a signal to turn on and off the auger 28. The flapper 112, itself, is curved to encourage, and not discourage, ice flow, and as full ice is reached raised upward and/or out of the way so as not to inhibit ice flowing from the auger to the ice discharge chute. This signal from the ice level sensor 110 is led to the unit's 14 control means 120 shown in FIGS. 21 and 22. Other means could be used to sense ice levels rather than the shown mechanical/electrical (micro switch) flapper sensor, for example, laser, ultra sonic or radar sensors could be used. With ice level optimally controlled, it is easier to transfer ice from the auger 28, through the cap 102 and into the discharge chute 32 without packing or jamming. The ice sensor 59 in the ice bin 18 will also control and shut off the unit if no ice is sensed.

Referring to FIGS. 2, 8, 9, 10 and 12, the top 96 of the auger 28 upper section 82 is provided with a transfer paddle 130 which as it rotates with the auger, assists in moving the ice off of the auger and horizontally into the cap and discharge chute. The paddle 130 is generally rectangular and no greater, actually slightly less than, the radius of the auger tube 58. The paddle 130 could be integrally formed with the auger shaft 66 and flight 76, or welded thereto. The paddle 130 would be made of the same material as or compatible to the auger, its shaft and flight.

The paddle 130 delivers the ice to the top of the discharge chute 32, from which it can be discharged into a container or cup, placed below the lower end of the discharge chute.

The discharge chute 32, like the rest of the chute, is made of clear plastic such as polycarbonate plastic. The discharge chute is otherwise somewhat similar in construction to that used on IMI Cornelius's non under counter ice dispenser chutes. The clear chute has the advantage of visually confirming that there is ice in the chute for delivery and provides a desirable appearance, indicating cleanliness and quality ice delivery. The bottom of the discharge chute 32 is closed by a gate 131 operated by an air cylinder 133.

Figure 21:
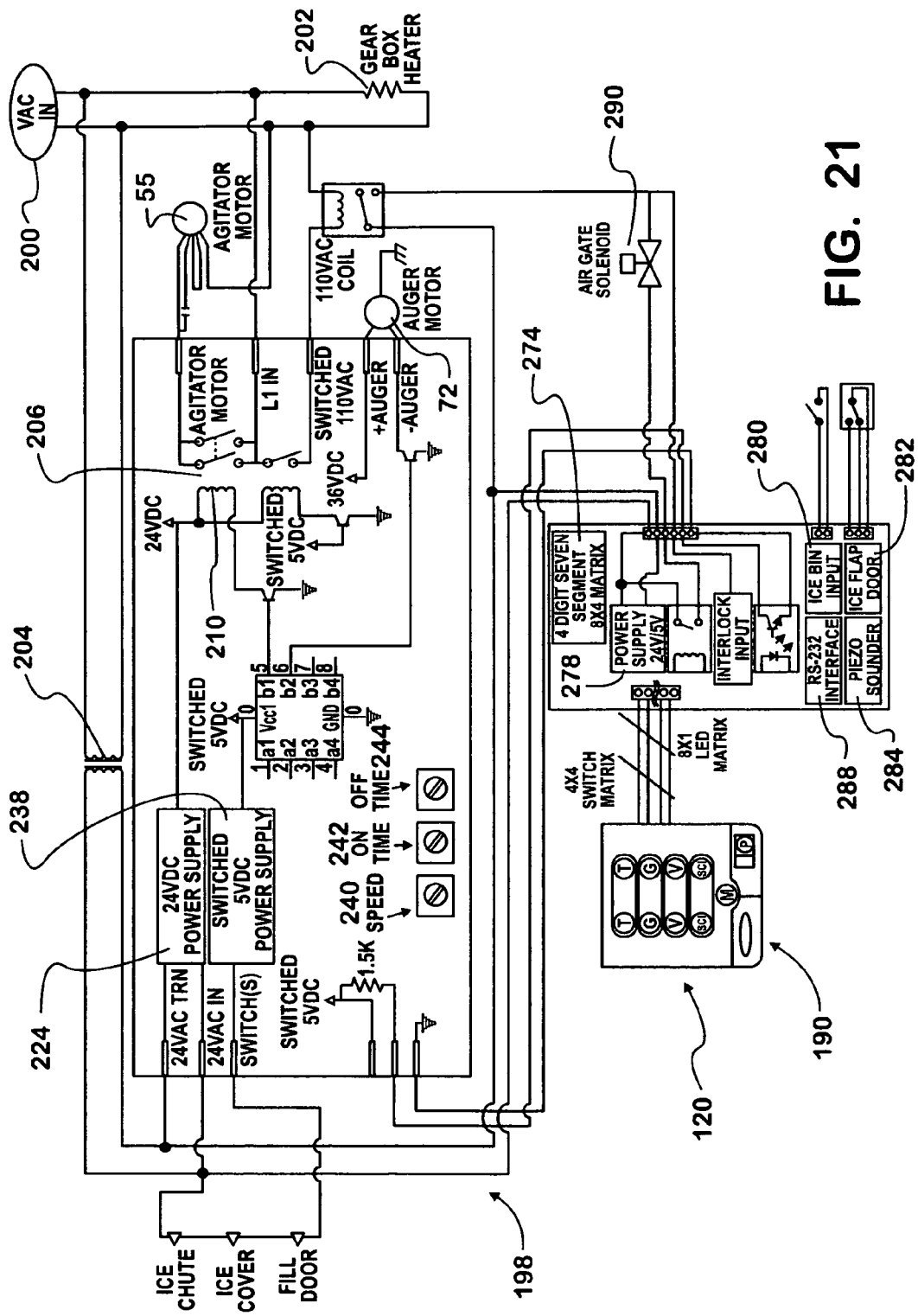
FIG. 21 is a schematic of the unit shown in FIG. 1 and its control means.
Figure 22:
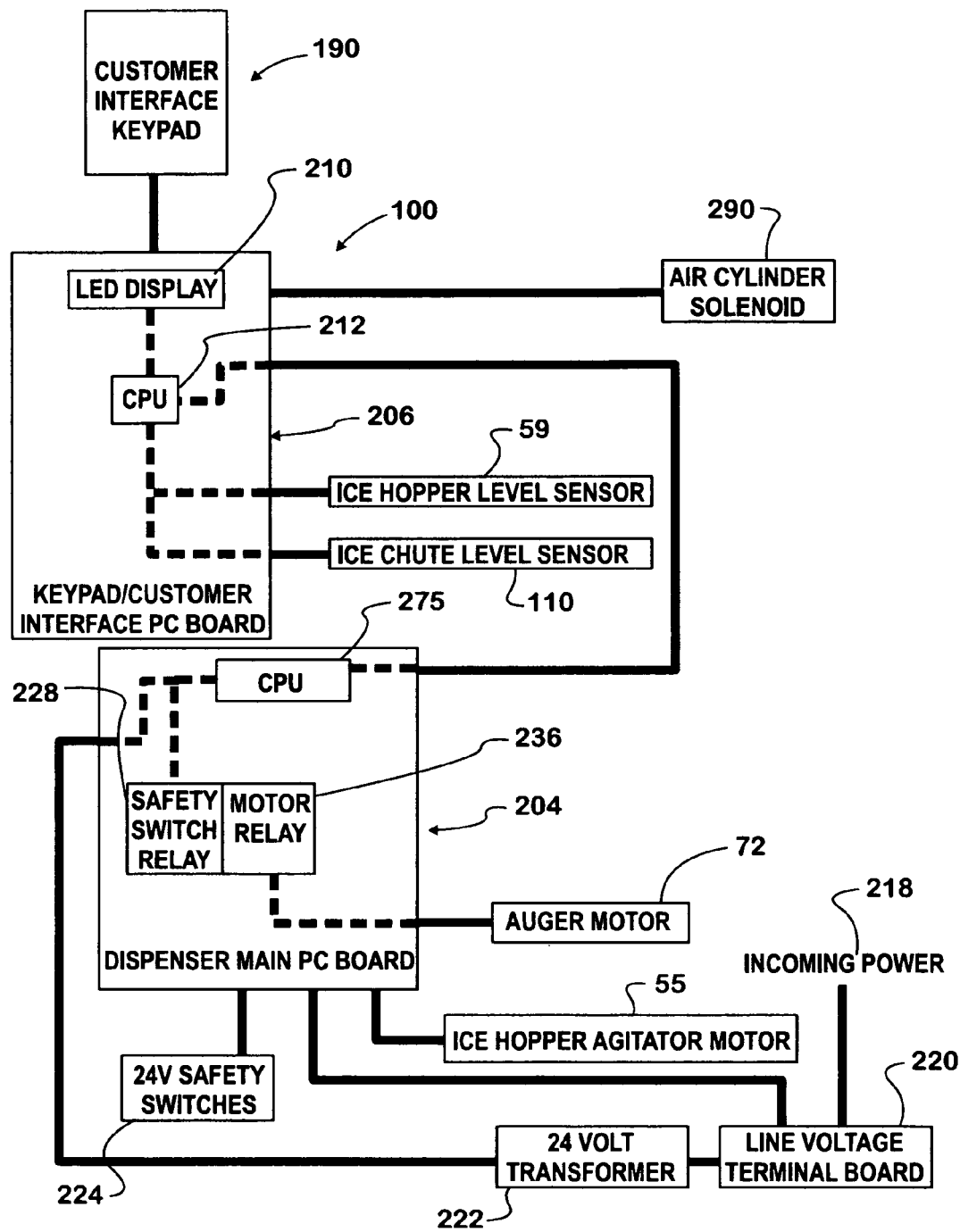
FIG. 22 is a further schematic of the control means and the devices of the dispenser it controls.

FIGS. 21 and 22 show a user/customer interface 190 which is the form of a keypad with eight keys (1 to 8) for: ice for various drink sizes, manual override buttons, and programming button with selectors to scroll up and down.

The unit as shown in FIG. 21 has a control 198 and also utilizes the proportional ice delivery system 120 used in IMI Cornelius's non undercounter units and generally shown in U.S. Pat. No. 6,039,220, mentioned above. The device 14 draws 120 volt AC current from a source or plug 200 which is provided to a heater 202 to keep the mechanicals of the device or unit from freezing. That line voltage is also supplied to a voltage dropping and isolation transformer 204, which provides 24 voltage to portions of the unit. The auger motors 72 and agitator 55 work a full line voltage. The line voltage can also be supplied to the double pole contacts of the relay 206 for the agitator motor 55. The agitator motor 55 powers the agitator 54 within the ice bin 18. This relay has a coil 210 which is part of the control system and its being energized closes the contacts of relay 206 to operate the motor 55 and its agitator 54. The unit also has a separate auger motor 72 to drive the auger 28. The auger motor 72 operates at full line voltage of 120 volts. The 24V DC power supply 224, via the circuit and voltage dropping resistor, is used to provide 5 V DC supply 238 for the device's control circuits. The 24 V AC is inputted into power supplies 234 and 238 to provide 24 V DC and 5V DC output currents respectively. The potentiometers 240, 242 and 244 input into the control circuits and are used to set and/or adjust "auger speeds", "on time", and "off time" to control the running of the auger 28 as desired. Two on-off type sensors or switches 59 and 110 are provided for the ice bin 18 and ice chute 32 to control operation of the device and, particularly, the auger 28 and its motor 72. If the ice chute sensor 110 or ice sensor or switch 59 indicates empty or the fill door sensor or switch 224 senses an open door position, the auger 28 is prevented from turning or operation. To the extent FIGS. 21 and 22 have not been described, the system shown is similar to that used in prior art undercounter dispensers.

The FIG. 21 control system is different from the prior art in that an on-off sensor or switch 110 is provided on/in the cap or cover 102 to sense when the auger 28 and ice chute 32 are already filled with ice and prevents operation of the auger 28 in that condition to avoid jams and damage. When that ice is discharged and/or below maximizing, that sensor or switch 110 provides an input to the control system that would permit the auger 28 to turn or operate to refill the ice chute 32 for the next use. The sensor or switch 110 is provided between and in series with the ice chute sensor and sensor 59.

Further as noted, the input interface keyboard 190 is provided for the operator/customer inputting selected and different ice quantities amounts for different size ice drinks. The interface 190 connects to the proportional ice control unit 120, which also has a display screen 274 for displaying inputs/outputs and trouble codes. The proportional control contains a logic portion or CPU 212, a power supply 278, ice bin input circuit 280, ice door or flap input circuit 282, a piezoelectric sounder 284, and a R8-232 port interface, indicated at 288, for a telephone hookup to provide for remote operation, troubleshooting and alarms. This unit also operates the air gate solenoid 290 which opens and closes the air cylinder 135 and the cup fill door or gate 131. This proportional ice unit 120 is similar to that described in U.S. Pat. No. 6,039,220, and/or sold by IMI Cornelius on its prior art model ED250 PROGATE above counter ice dispensers.

FIG. 22 shows how the controller 120 and its dispenser main PC board 204 and its keypad/customer interface 190, and PC Board 206 are used to control and operate the air cylinder 135 and its solenoid 290 which operates the air cylinder 135 for the ice chute lower discharge gate 131. The LED display 274 is, for example, a four or five character display, so that an output, for example, "PRG" (for purge) could be displayed. The ice hopper ice level sensor 59 and ice chute level sensor 110 input to the CPU 212 in the interface PC board 206. The main PC board 204 also controls the ice hopper agitator motor 55 and the ice auger motor 72. Power is supplied to boards 204 and 206, via a source 218, a line voltage terminal board (to maintain voltage/power quality) 220 and to a 24 volt transformer 222 for use in 24 volt safety switches 224 to prevent injury by the agitator or auger when the covering guards, housings and potential moving parts are exposed or are removed, which operate via a relay 228, to the master relay 236 which would shut down the entire unit.

While the preferred embodiments have been disclosed and described, it should be understood that equivalent elements and steps of those described in the appended, claims would fall within the scope of those claims.

What is claimed is:

1. An undercounter ice dispenser, comprises an ice bin adapted to be located under a countertop, an ice discharge chute adapted to be located above the countertop, auger means for delivering ice from the ice bin to the ice discharge chute, said auger means being formed in at least two separable sections, a lower section and an upper section, said lower and upper sections having cooperating means for connecting the two sections to rotate together, whereby the two sections of the auger means can he assembled to form an auger means extending from the ice bin to the ice discharge chute, wherein said upper portion of said auger means has paddle means for delivering ice from a top of said upper section of said auger means to said ice discharge chute, an ice level sensor at a top of the upper section of said auger means, said ice level sensor comprises a flapper pivotally mounted on said dispenser near the top of said upper section of said auger means, said flapper being curved to encourage transfer of ice from said auger means to said discharge chute and providing a minimum obstruction when said auger means is full of ice, a control unit, said dispenser including means for proportionally delivering ice for various size drinks, said discharge chute and at least a portion of said auger means above said countertop is made of clear material so that the ice therein is visible, said auger means section are of a total length of less than six feet and at least one section of said auger means is at least one and one half feet in length, said lower section at a top and said upper section at a bottom thereof have cooperating means for connecting the lower and upper sections together, said auger means includes an auger tube extending from the ice bin to said ice discharge chute, said sections rotating in said auger tube, and an auger motor, said auger motor driving at least one of said auger sections, wherein said motor rotatably guides said lower section and said auger tube provides additional rotational guidance for said upper section, said motor includes and drives a gear box and said gear box is attached to and drives a bottom of said lower section, said flapper engages a microswitch, said upper section near its upper end has said paddle secured thereto for pushing ice into said ice discharge chute, and a customer interface for selecting a drink size and providing for a selected amount of ice to be driven from said upper section of said auger mean into said ice discharge chute, and said control means with proportional ice means cooperating with said customer interface for controlling the amount of ice delivered into said ice discharge chute.

2. An undercounter ice dispenser, comprises an ice bin adapted to be located under a countertop, an ice discharge chute adapted to be located above the countertop, auger means for delivering ice from the ice bin to the ice discharge chute, said auger means being formed in at least one section, an upper end of said auger means has paddle means for delivering ice from a top of said upper end of said auger means to said ice discharge chute, an ice level sensor adjacent a top of said auger means, wherein said ice level sensor comprises a flapper pivotally mounted on said dispenser near the top end of said auger means, said flapper being curved to encourage transfer of ice from said auger means to said discharge chute and providing a minimum obstruction when said auger means is full of ice, wherein said flapper engages a microswitch.

3. An undercounter ice dispenser, comprises an ice bin adapted to be located under a countertop, an ice discharge chute adapted to be located above the countertop, auger means for delivering ice from the ice bin to the ice discharge chute, said auger means being formed in at least one section, and an ice level sensor at a top of the auger means, wherein said ice level sensor comprises a flapper pivotally mounted on said dispenser near the top of said upper section of said auger means, said flapper being curved to encourage transfer of ice from said auger means to said discharge chute and providing a minimum obstruction when said auger means is full of ice, wherein said flapper engages a microswitch.

\* \* \* \* \*